(12) United States Patent
Fuehrer et al.

(10) Patent No.: US 10,675,988 B2
(45) Date of Patent: Jun. 9, 2020

(54) PLUG CONNECTOR PART HAVING COOLED CONTACT ELEMENTS FOR CHARGING ELECTRICAL VEHICLES

(71) Applicant: PHOENIX CONTACT E-MOBILITY GMBH, Schieder-Schwalenberg (DE)

(72) Inventors: Thomas Fuehrer, Blomberg (DE); Robert Babezki, Steinheim (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 16/327,333

(22) PCT Filed: Sep. 14, 2017

(86) PCT No.: PCT/EP2017/073073
§ 371 (c)(1),
(2) Date: Feb. 22, 2019

(87) PCT Pub. No.: WO2018/050724
PCT Pub. Date: Mar. 22, 2018

(65) Prior Publication Data
US 2019/0176653 A1 Jun. 13, 2019

(30) Foreign Application Priority Data

Sep. 16, 2016 (DE) .......................... 10 2016 117 439

(51) Int. Cl.
*B60L 53/302* (2019.01)
*H01R 13/52* (2006.01)
(Continued)

(52) U.S. Cl.
CPC .............. *B60L 53/302* (2019.02); *B60L 53/16* (2019.02); *B60L 53/18* (2019.02); *B60L 53/30* (2019.02);
(Continued)

(58) Field of Classification Search
CPC .............. H01R 13/521; H01R 13/5202; H01R 13/5205; H01R 13/5216; Y02T 90/14;
(Continued)

(56) References Cited

U.S. PATENT DOCUMENTS

| 3,244,792 A | 4/1966 | Lawton |
| 5,599,195 A | 2/1997 | Mitani et al. |

(Continued)

FOREIGN PATENT DOCUMENTS

| DE | 102010007975 A1 | 8/2011 |
| DE | 202011050446 U1 | 9/2011 |

(Continued)

*Primary Examiner* — Briggitte R. Hammond
(74) *Attorney, Agent, or Firm* — Leydig, Voit & Mayer, Ltd.

(57) ABSTRACT

A plug connector part includes: a plug section for plugging connection to an associated counter plug connector part; at least one contact element arranged on the plug section and having at least one electrically-conductive contact section for plugging connection to an associated counter-contact element of the counter plug connector part, and a shaft section connected to the contact section for securing an electrical line to the contact element; and a casing element that is attachable to the shaft section of the at least one contact element and has a body, a plug opening formed in the body for receiving the shaft section, and a cooling channel which is formed in or on the body and extends around the plug opening for conducting a coolant.

15 Claims, 11 Drawing Sheets

(51) Int. Cl.
  *B60L 53/16* (2019.01)
  *B60L 53/30* (2019.01)
  *B60L 53/18* (2019.01)
  *H02G 3/02* (2006.01)
  *H02G 15/013* (2006.01)

(52) U.S. Cl.
  CPC ..... *H01R 13/5205* (2013.01); *H01R 13/5216* (2013.01); *H01R 13/521* (2013.01); *H01R 13/5202* (2013.01); *H02G 3/02* (2013.01); *H02G 15/013* (2013.01); *Y02T 10/7005* (2013.01); *Y02T 10/7088* (2013.01); *Y02T 90/121* (2013.01); *Y02T 90/14* (2013.01)

(58) Field of Classification Search
  CPC ..... Y02T 90/121; Y02T 10/7005; H02G 3/02; H02G 3/03; B60L 53/302; B60L 53/16; B60L 53/18; B60L 53/30
  See application file for complete search history.

(56) References Cited

U.S. PATENT DOCUMENTS

| | | | | |
|---|---|---|---|---|
| 5,684,380 A | * | 11/1997 | Woody | H01F 38/14 320/108 |
| 5,909,099 A | * | 6/1999 | Watanabe | A61K 31/726 320/108 |
| 6,396,241 B1 | * | 5/2002 | Ramos | B60L 53/34 320/108 |
| 7,067,768 B2 | * | 6/2006 | Miwa | B23K 11/315 219/137.31 |
| 7,641,506 B2 | * | 1/2010 | Sacher | H01R 4/28 439/485 |
| 9,099,217 B2 | | 8/2015 | Schlögl | |
| 9,233,618 B2 | * | 1/2016 | Dyer | B60L 53/11 |
| 9,287,646 B2 | * | 3/2016 | Mark | G06F 1/20 |
| 9,321,362 B2 | * | 4/2016 | Woo | B60L 53/11 |
| 2009/0239408 A1 | | 9/2009 | Sacher et al. | |
| 2015/0217654 A1 | | 8/2015 | Woo et al. | |
| 2016/0190718 A1 | * | 6/2016 | Vanzuilen | H01R 12/515 310/71 |
| 2017/0028862 A1 | * | 2/2017 | Nagel | B60L 11/1818 |
| 2019/0036254 A1 | | 1/2019 | Moseke | |
| 2019/0176653 A1 | * | 6/2019 | Fuehrer | H01R 13/5205 |

FOREIGN PATENT DOCUMENTS

| | | |
|---|---|---|
| DE | 102010045522 A1 | 3/2012 |
| DE | 102010050562 B3 | 4/2012 |
| DE | 102015119338 A1 | 5/2017 |
| EP | 3043421 A1 | 7/2016 |
| JP | 200556770 A | 3/2005 |
| WO | WO 2017162494 A1 | 9/2017 |

* cited by examiner

PLUG CONNECTOR PART HAVING COOLED CONTACT ELEMENTS FOR CHARGING ELECTRICAL VEHICLES

CROSS-REFERENCE TO PRIOR APPLICATIONS

This application is a U.S. National Phase application under 35 U.S.C. § 371 of International Application No. PCT/EP2017/073073, filed on Sep. 14, 2017, and claims benefit to German Patent Application No. DE 10 2016 117 439.4, filed on Sep. 16, 2016. The International Application was published in German on Mar. 22, 2018 as WO 2018/050724 under PCT Article 21(2).

FIELD

The invention relates to a plug connector part.

BACKGROUND

Such a plug connector part comprises a plug section for plugging connection to an associated counter plug connector part, and at least one contact element which is arranged on the plug section and has at least one electrically-conductive contact section for plugging connection to an associated counter-contact element of the counter plug connector part, and a shaft section connected to the contact section for securing an electrical line to the contact element.

A plug connector part can be used, in particular, as a charging plug or charging socket for charging an electrically-driven vehicle (also referred to as an electric vehicle). When used as a charging plug, a cable is, for example, connected, on the one hand, to a charging station and, on the other, carries the plug connector part which can be plugged into an associated counter plug connector part in the form of a charging socket on a vehicle in order, in this way, to establish an electrical connection between the charging station and the vehicle.

Charging currents can in principle be transmitted as direct currents or as alternating currents, wherein, in particular, charging currents in the form of direct current have a high current intensity, e.g., more than 200 A or even more than 300 A or even 350 A, and can lead to heating of the cable, as well as of a plug connector part connected to the cable.

A charging cable known from DE 10 2010 007 975 B4 has a cooling line which comprises a supply line and a return line for a coolant, thus allowing for coolant flow back and forth in the charging cable. In this case, the cooling line of DE 10 2010 007 975 B4 serves firstly to dissipate heat loss arising at an energy accumulator of a vehicle, but also to cool the cable per se.

In a charging system for charging an electric vehicle, heat is generated not only at the cable with which a charging plug is, for example, connected to a charging station, but also at the charging plug and, in particular, within the charging plug, e.g., at contact elements via which an electrical contact with associated counter-contact elements is, for example, established on the side of a charging socket on an electric vehicle when the charging plug is plugged into the charging socket. Such contact elements, which are produced from an electrically-conductive metal material, e.g., from a copper material, heat up when a charging current flows through the contact elements, wherein the contact elements are basically to be dimensioned as a function of the charging current to be transmitted, such that the contact elements have sufficient current load capacity, and heating at the contact elements is limited. In this case, it holds that a contact element is to be dimensioned to be larger, the higher the charging current to be transmitted is.

A scaling of the contact element size with increasing charging current is, however, limited, due to the associated installation space, weight, and cost. There is therefore a need to transmit a high charging current with a comparatively small-dimensioned contact element.

In a plug connector part known from DE 10 2010 050 562 B3 for electrically charging a vehicle drivable with electrical energy, a handle part is provided on a charging plug, through which handle part extend channels for cooling, in particular, the handle part.

In a plug connector part known from U.S. Pat. No. 5,909,099 in the form of a charging plug, coolant hoses are arranged on a section of a contact element, through which coolant hoses can flow a coolant for cooling the contact element.

SUMMARY

In an embodiment, the present invention provides a plug connector part, comprising: a plug section configured for plugging connection to an associated counter plug connector part; at least one contact element arranged on the plug section and having at least one electrically-conductive contact section configured for plugging connection to an associated counter-contact element of the counter plug connector part, and a shaft section connected to the contact section configured to secure an electrical line to the contact element; and a casing element that is attachable to the shaft section of the at least one contact element and has a body, a plug opening formed in the body configured to receive the shaft section, and a cooling channel which is formed in or on the body and extends around the plug opening for conducting a coolant.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
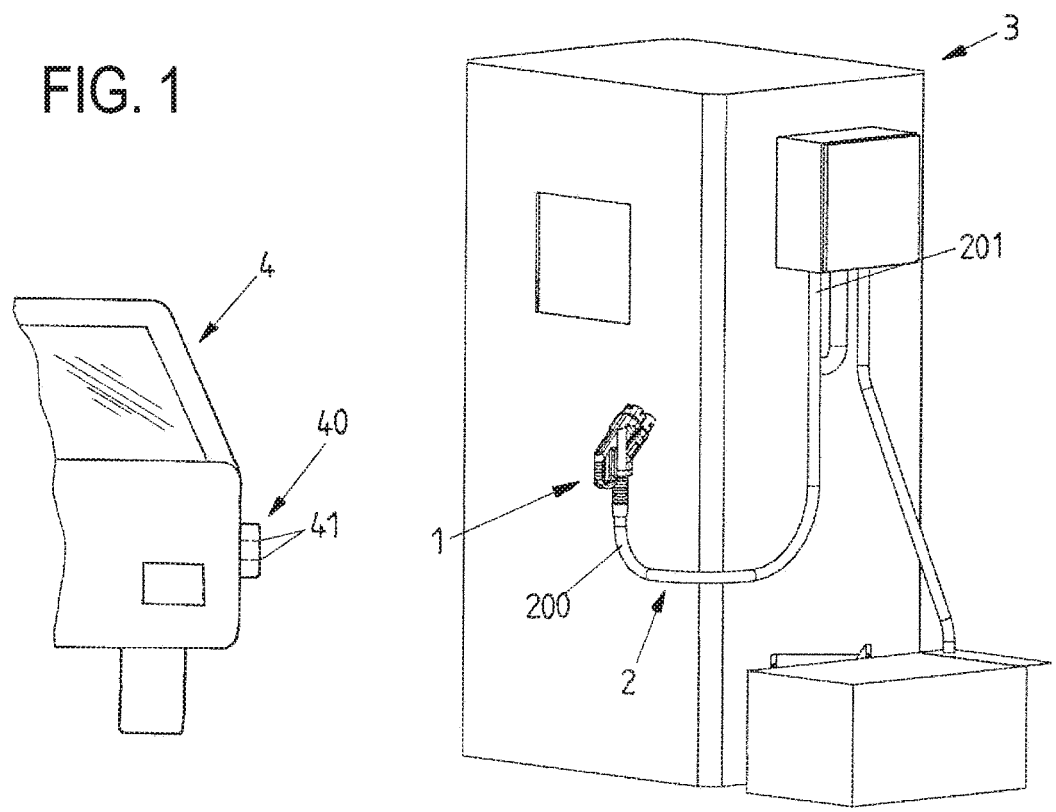
FIG. 1 shows a view of a charging station, with a cable arranged thereon.

In an embodiment, the present invention provides a plug connector part which can provide active cooling for a contact element in order to obtain a high current load capacity, despite a comparatively small-dimensioned contact element.

Accordingly, the plug connector part has a casing element which can be attached to the shaft section of the at least one contact element and which has a body, a plug opening formed in the body for receiving the shaft section, and a cooling channel formed in or on the body and extending around the plug opening for conducting a coolant.

The cooling channel can, for example, extend helically around the plug opening.

Thus, active cooling is provided at the contact element by using a casing element in which a cooling channel is formed. The casing element can be plugged onto the shaft section of the contact element so that, in the plugged-in position, the shaft section extends through the plug opening of the casing element. As a result of the fact that the cooling channel extends around the plug opening, heat can be absorbed at the shaft section and dissipated from the contact element via a coolant flowing through the cooling channel.

Such a casing element can be mounted on the contact element in a simple manner. In particular, complicated laying of cooling hoses around the contact element is not required.

Fluid cooling is thus used for cooling the contact element, in the context of which, a coolant, such as a coolant liquid or a gaseous fluid (e.g., air), is conducted along the shaft section of the contact element. Heat generated at the shaft section of the contact element can be dissipated via the coolant so that cooling is provided for the contact element, and excess heating of the contact element is thus counteracted.

For example, if a charging plug has contact elements that realize several load contacts, each contact element can be cooled individually by conducting a coolant through the fluid channel of the contact element formed on the shaft section and thus dissipating heat from the contact element.

The contact element may have a longitudinally-extending, substantially cylindrical basic shape, and the shaft section may accordingly be cylindrically shaped.

For example, the contact element can be engaged, by way of plugging, in an associated counter-contact element along a plug-in direction, wherein the contact element can, for example, be designed as a contact pin or as a contact socket, or even as a so-called hermaphroditic contact. In a contact pairing, a contact pin is, for example, engaged in a contact socket in order to establish, by way of plugging, an electrical contact between the contact elements. The cylinder axis of the shaft section extends in this case preferably in parallel to the plug-in direction. The cylindrical shaft section has an outer circumferential surface around which the cooling channel extends and via which heat is thus dissipated from the contact element.

The contact element is preferably formed integrally with its contact section and the shaft section. The contact element is electrically conductive and made of metal, e.g., of a copper material or another suitable contact material.

When the casing element is attached to the shaft section of the associated contact element, the casing element embraces with its body the circumferential surface of the shaft section. In order to achieve improved heat transfer from the shaft section into the body of the casing element, a material having particularly good thermal conductivity—in particular, a pasty material in the form of a heat-conducting paste—can in this case be arranged between the circumferential surface and the body. Such a heat-conducting paste can be lubricated before placing the casing element on the shaft section of the contact element onto the shaft section or into the plug opening of the casing element, so that the heat-conducting paste is distributed on the shaft section when the casing element is attached and thus seals a gap between the circumferential surface of the shaft section and the body of the casing element.

The body of the casing element is preferably made of an electrically-insulating material, e.g., of a thermoplastic material filled with ceramic particles, and, advantageously, has a good thermal conductivity. Because the body of the casing element acts in an electrically-insulating manner, a coolant flowing through the cooling channel of the casing element is electrically insulated from the shaft section of the contact element so that an electrically-conductive medium, e.g., water, can be used as coolant.

The casing element is preferably inserted into a cooling housing so that the casing element together with the cooling housing delimits the cooling channel. The cooling channel may, for example, be formed in a circumferential outer surface of the casing element and is closed toward the outside by way of the cooling housing—for example, by inserting the casing element into an associated opening of the cooling housing.

In this case, the casing element can be sealed off from the cooling housing by suitable sealing elements—for example, circumferential sealing rings in the form of O-rings.

In one embodiment, the plug connector part may, for example, have (at least) one pair of two contact elements, wherein a casing element and a cooling housing are arranged on the shaft section of each contact element. When the plug connector part is designed as a charging plug or as a charging socket, a charging current in the form of a direct current can, for example, be transmitted via such a pair of contact elements so that the contact elements form load contacts at which heating can occur during operation of the plug connector part.

In one embodiment, the cooling housings of the two contact elements can be designed to be mirror-symmetrical to one another. The cooling housings can thus be connected to one another in order to create a uniform block which can be mounted in a housing of the plug connector part. This simplifies not only the arrangement and attachment of the cooling housings in the housing of the plug connector part, but also assembly.

An inlet opening for introducing a coolant into the cooling channel and an outlet opening for discharging a coolant from the cooling channel are preferably formed on the cooling housing of each contact element. In order to thereby conduct coolant to the cooling channels of the individual contact elements, a distribution element may be provided, which has at least one inlet port for introducing a coolant and at least one outlet port for discharging the coolant. The inlet port may be connected to a first coolant line, which is laid in a cable connected to the plug connector part, so that coolant from a charging station, for example, can be supplied via this first coolant line. A second coolant line, which is likewise laid in the cable, is connected to the outlet port in order to conduct coolant back to the charging station. Thus provided is a coolant circuit, via which coolant is conducted from the charging station toward the plug connector part in order to absorb heat at the plug connector part (in particular, the contact elements of the plug connector part) and at the cable, and transport it away.

Advantageously, a uniform distribution element is provided, which is connected jointly to the two cooling housings of the pair of contact elements. The distribution element and the cooling housing of the contact elements can be rigidly connected and thus provide a pre-assembled unit which is to be attached in the housing of the plug connector part.

The distribution element serves to conduct the coolant supplied via a first coolant line to the cooling channels of the individual contact elements and to return the coolant via the second coolant line. In this respect, one or more first coolant lines for supplying the coolant and one or more second coolant lines for returning the coolant may be provided, such that the distribution element has the function of distributing the coolant from the one or more first coolant lines to the inlet openings on the cooling housings and feeding the coolant to be returned from the outlet openings of the cooling housings back into the one or more second coolant lines.

For this purpose, first flow channels for distributing the coolant from the at least one inlet port to the inlet openings of the cooling housing, and also second flow channels for feeding the coolant from the outlet openings of the cooling housings into the at least one outlet port for returning the coolant, are formed in the distribution element.

In a specific embodiment, an inlet port for introducing the coolant and two outlet ports for returning the coolant may, for example, be provided. The coolant is thus supplied via a (single) first coolant line. The coolant is returned, however, via two separate, second coolant lines. The coolant is distributed via the first flow channels to the inlet openings of the cooling housings. In contrast, the coolant is returned from the outlet openings to the two second outlet ports via the second flow channels.

In addition, one embodiment may provide that the distribution element have at least one third flow channel which extends between at least one of the first position channels and at least one of the second flow channels. Via such a third flow channel can be provided a flow short circuit, via which, within the distribution element, a coolant flow between the first flow channels and the second flow channels can be adjusted.

In this case, an adjusting element, e.g., in the form of a screw element or the like, can be provided, via which the coolant flow through the third flow channel can be adjusted. This may, for example, take place during assembly by the manufacturer in order to affect the active cooling adjusted at the contact elements.

FIG. 1 shows a charging station 3, which serves to charge an electrically-driven vehicle 4—also referred to as electric vehicle. The charging station 3 is designed to provide a charging current in the form of an alternating current or a direct current and has a cable 2 which is connected with one end 201 to the charging station 1 and, with another end 200, to a plug connector part 1 in the form of a charging plug.

Figure 2:
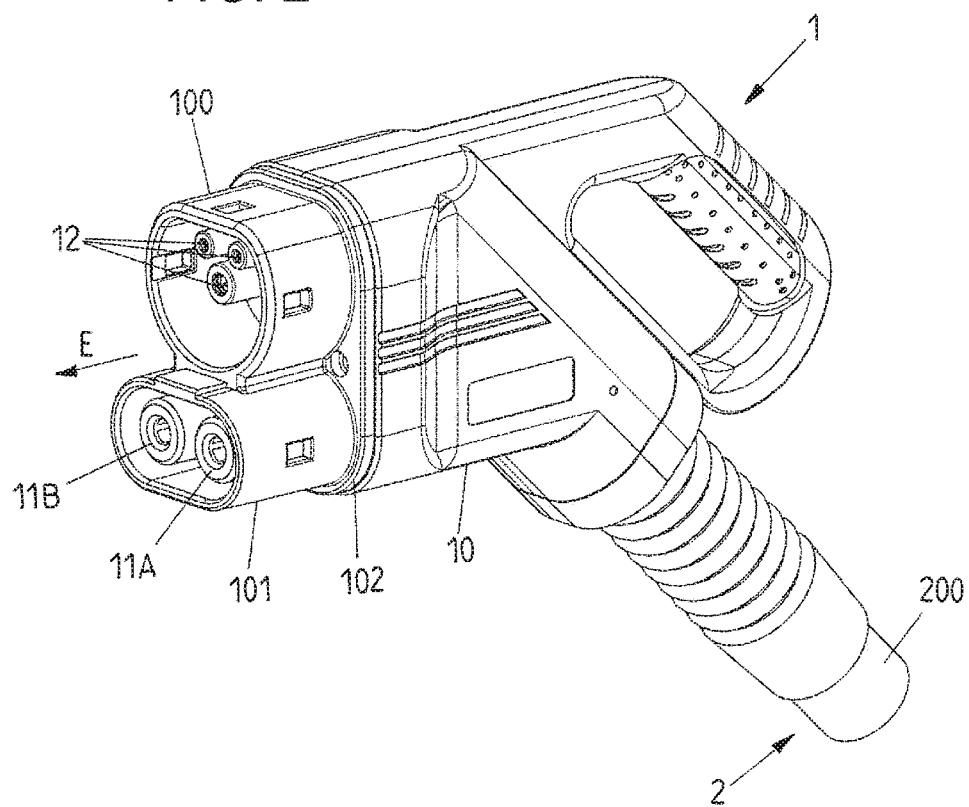
FIG. 2 shows a view of a plug connector part in the form of a charging plug.

As can be seen from the view according to FIG. 2, on a housing 10, the plug connector part 1 has plug sections 100, 101, with which the plug connector part 1 can be engaged, by way of plugging, in an associated counter plug connector part 40 in the form of a charging socket on the vehicle 4. In this way, the charging station 3 can be electrically connected to the vehicle 4 in order to transmit charging currents from the charging station 3 to the vehicle 4.

In order to ensure a charging of the electric vehicle 4 within the framework of a so-called fast charging process, the transmitted charging currents have a high current intensity—for example, more than 200 A, and possibly even on the order of magnitude of 350 A or more. Due to such high charging currents, thermal losses occur at the cable 2, and also at the plug connector part 1 and the charging socket 4, which can lead to heating of the cable 2, the plug connector part 1, and the charging socket 4.

Figure 3:
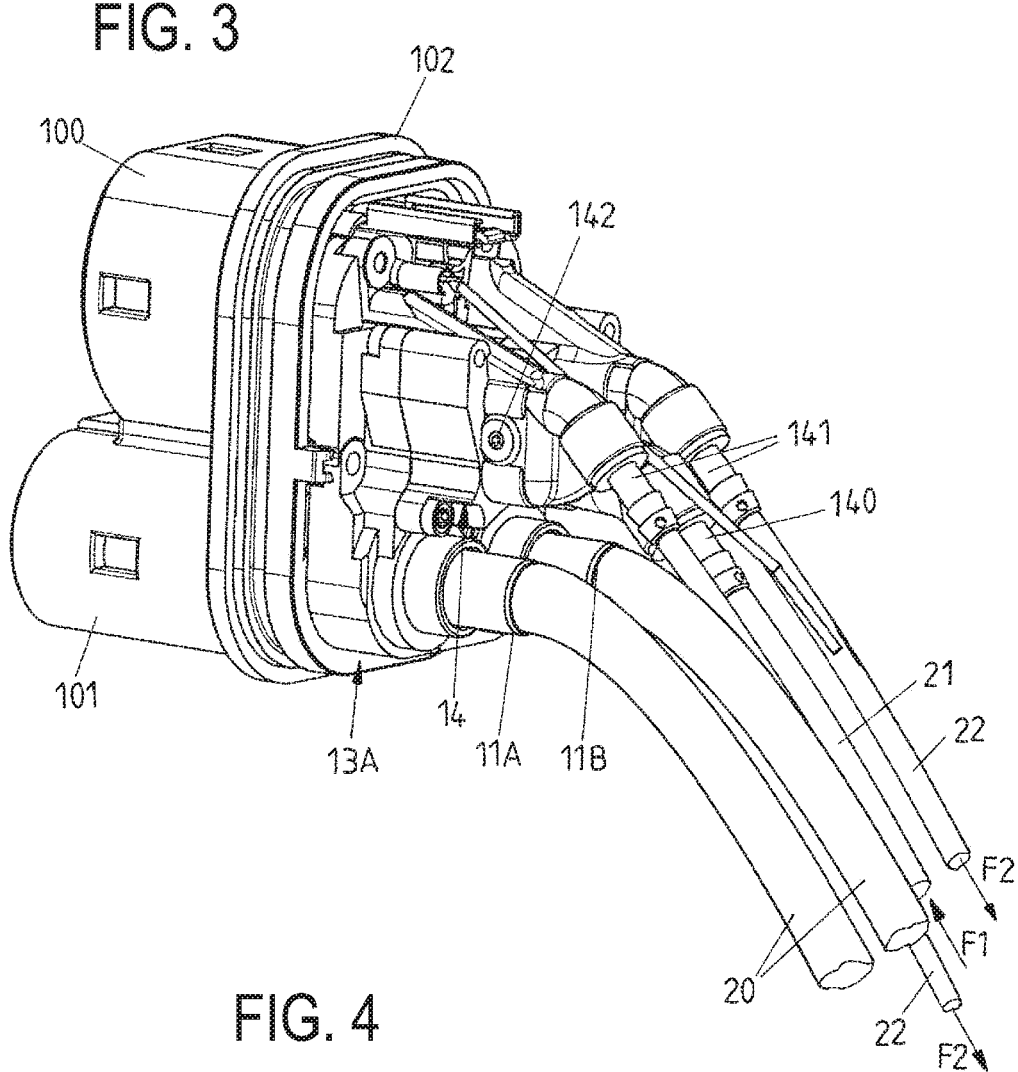
FIG. 3 shows a view of a housing part of the plug connector part, with contact elements arranged thereon and a cooling device for actively cooling the contact elements.

FIG. 3 shows a separate view of a housing part 102 of the housing 10 on which the plug sections 100, 101 are arranged and which carries contact elements 11A, 11B, 12 (see FIG. 2) which protrude into the plug sections 100, 101 and establish an electrical contact when the plug connector part 1 is connected to the counter plug connector part 40. In this case, the contact elements 11A, 11B arranged on the lower contact section 101 serve to transmit a charging current in the form of a direct current and thus form load contacts of the plug connector part 1. In contrast, via the contact elements 12 arranged on a contact holder 120 on the other, upper plug section 100, a neutral wire can be contacted, and control signals can, moreover, be transmitted.

Figure 4:
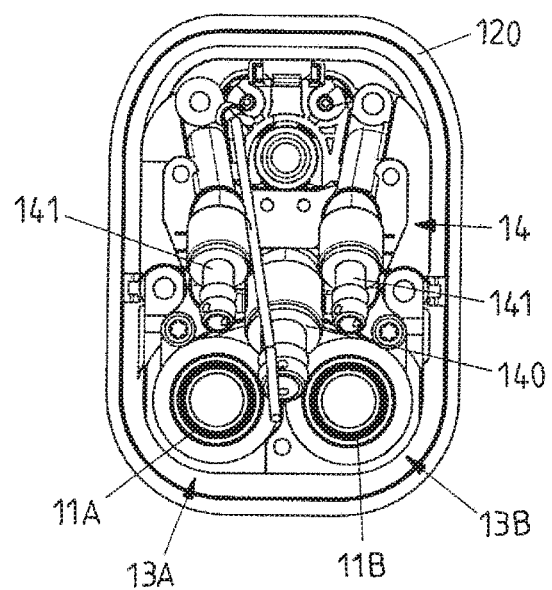
FIG. 4 shows a rear view of the assembly according to FIG. 3.
Figure 5:
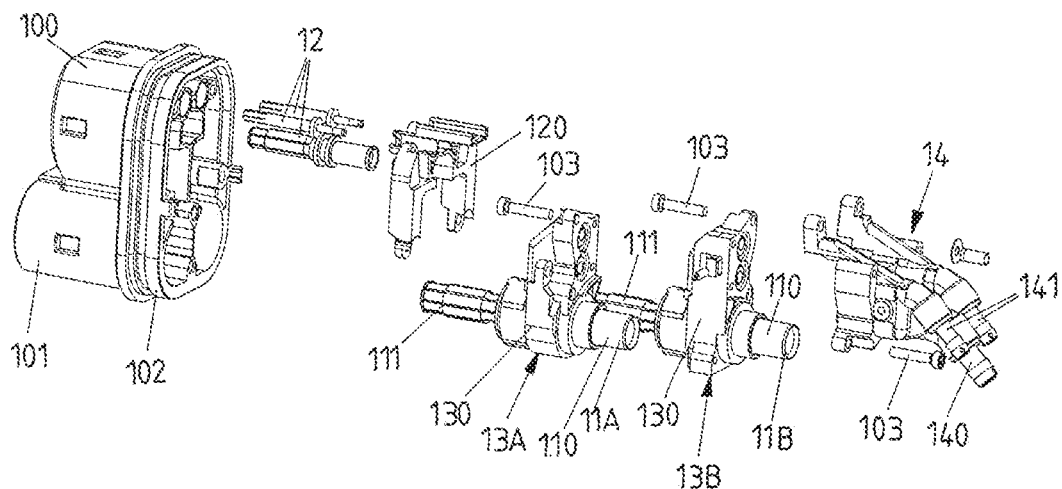
FIG. 5 shows an exploded view of the assembly according to FIG. 3.

At the plug connector part 1, an active cooling is provided at the contact elements 11A, 11B forming the load contacts on the lower plug section 101, in the context of which cooling, coolant is conducted past the contact elements 11A, 11B in order to absorb heat at the contact elements 11A, 11B and transport it away from the contact elements 11A, 11B. As can be seen from FIGS. 3 through 5, a cooling housing 13A, 13B is arranged for this purpose on each contact element 11A, 11B, which cooling housings are jointly connected to a distribution element 14 and serve to conduct the coolant.

The contact elements 11A, 11B each have a contact section 111 in the form of a contact socket, into which a counter-contact element 41 in the form of a contact pin on the side of the counter plug connector part 40 can be inserted by way of plugging. In contrast, an electrical line 20 schematically shown in FIG. 3 can be connected via a shaft section 110 which is connected to the contact section 111.

The electrical lines 20 are guided in the cable 2 and establish an electrical connection of the respective contact element 11A, 11B to the charging station 3.

Figure 6:
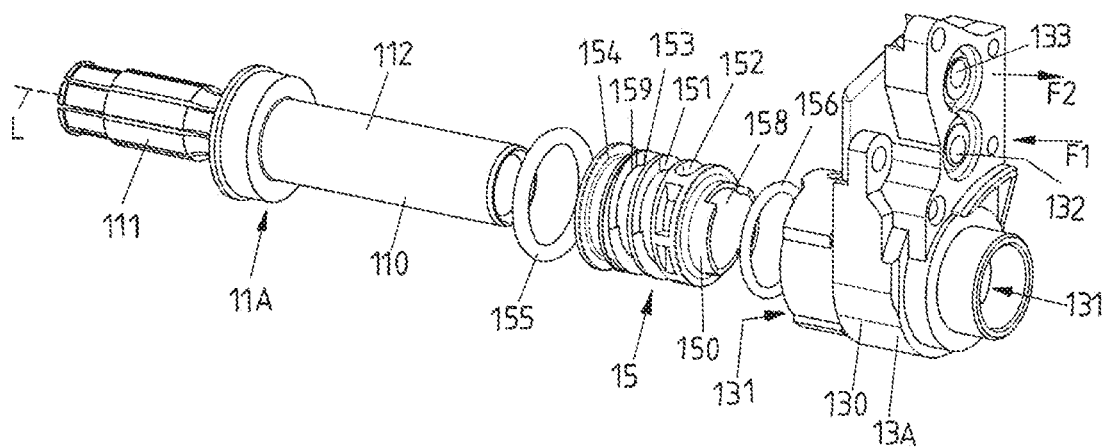
FIG. 6 shows a separate view of a contact element, having a casing element to be arranged thereon and a cooling housing.

In a separate exploded view, FIG. 6 shows a contact element 11A and an associated cooling housing 13A forming an opening 131 into which a casing element 15 is inserted.

The casing element 15 has a body 150 with a plug opening 158 formed thereon, into which the associated contact element 11A is inserted with the cylindrical shaft section 110 remote from the contact section 111, so that the contact element 11A with its shaft section 110 penetrates the body 150 of the casing element 15.

A cooling channel 159 is formed on the casing element 15 by means of a circumferential rib 151 on a side facing away from the shaft section 110 and extends helically around the shaft section 110, and a coolant can be conducted through said cooling channel in order to cool the contact element 11A. In this case, the coolant can be introduced at a first end 152 of the cooling channel 159 and discharged again from the cooling channel 159 at a second end 153 so that a coolant circuit can be provided by the cooling channel 159.

Figure 7A:
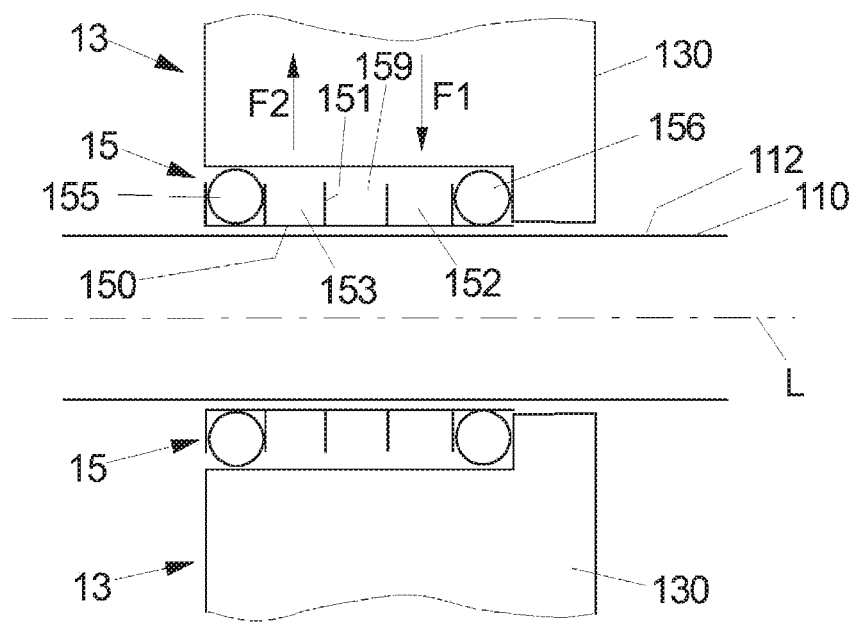
FIG. 7A shows a schematic, cross-sectional view of the casing element at the contact element.

When the plug connector part 1 is mounted, the casing element 15 is inserted into the opening 131 within a body 130 of the cooling housing 13A and sealed from the cooling housing 13A via sealing elements in the form of sealing rings 155, 156, as schematically illustrated in FIG. 7A. A first sealing element 155 is located in a circumferential seat 154 on the body 150 of the casing element 15 and seals the casing element 15 at an axial end from the body 130 of the cooling housing 13A. In contrast, a second sealing element 156 comes to rest at the other axial end of the casing element 15 between the casing element 15 and the body 130 of the cooling housing 13A, so that the casing element 15 is also sealed off from the body 130 at this other end.

Figure 7B:
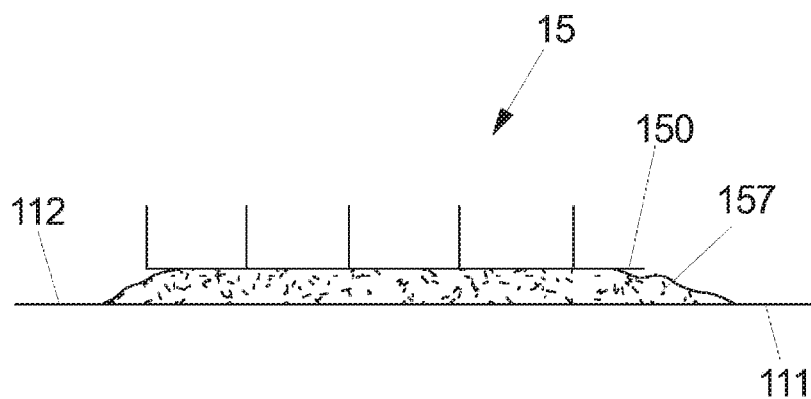
FIG. 7B shows a schematic view of a heat-conducting paste in a gap between the casing element and the contact element.

The shaft section 110 has a cylindrical shape, and the casing element 15 accordingly has a hollow cylindrical shape. In the assembled state, the shaft section 110 penetrates through the plug opening 158 within the body 150, wherein a heat-conducting paste 157 is preferably arranged between the body 150 and the shaft section 110, as illustrated schematically in FIG. 7B. By means of the heat-conducting paste 157, a gap between the body 150 of casing element 15, on the one hand, and a cylindrical circumferential surface 112 of the shaft section 110 of the contact element 11A, on the other, may be closed so that a favorable heat transfer between the shaft section 110 and the casing element 15 is achieved.

The contact element 11A is integrally made of an electrically-conductive material—for example, a copper material. In contrast, the intermediate element 15 as well as the cooling housing 13A are preferably made from an electrically-insulating material, e.g., a plastic material, so that a coolant flowing through the cooling channel 159 is electrically insulated from the contact element 11A. This makes it possible to use an electrically-conductive coolant—for example, an aqueous coolant.

The casing element 15 (and possibly also the cooling housing 13A) can, in particular, be made, for example, from a plastic material filled with ceramic particles—for example, a thermoplastic material. The casing element 15 and the cooling housing 13A preferably have good thermal conductivity, so that heat can be absorbed efficiently by the coolant flowing through the cooling housing 13A.

Figure 8A:
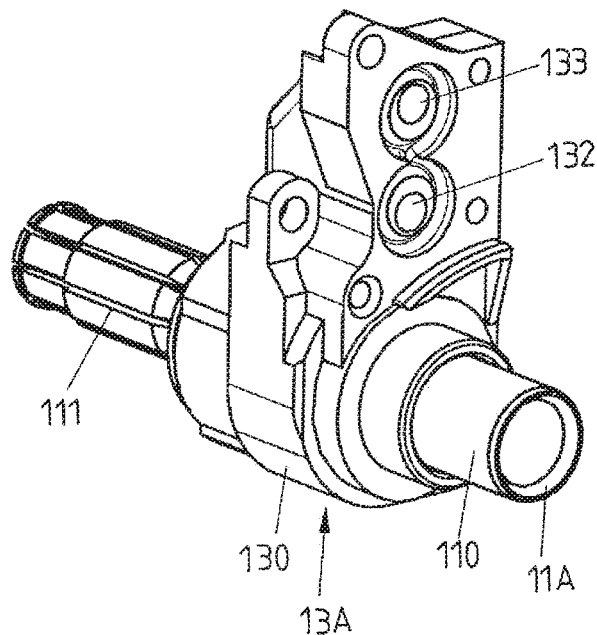
FIG. 8A shows a separate view of a contact element, having a casing element arranged thereon and a cooling housing.
Figure 8B:
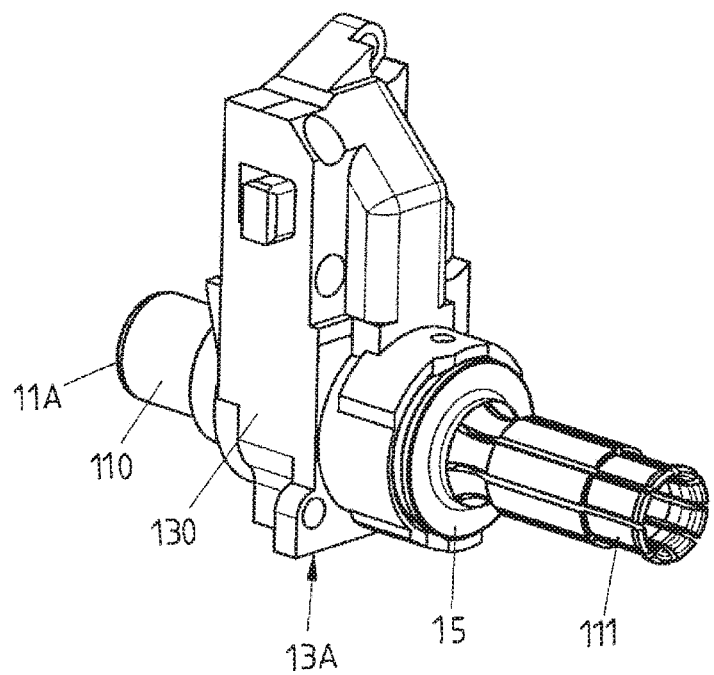
FIG. 8B shows another perspective view of the assembly according to FIG. 8A.
Figure 9A:
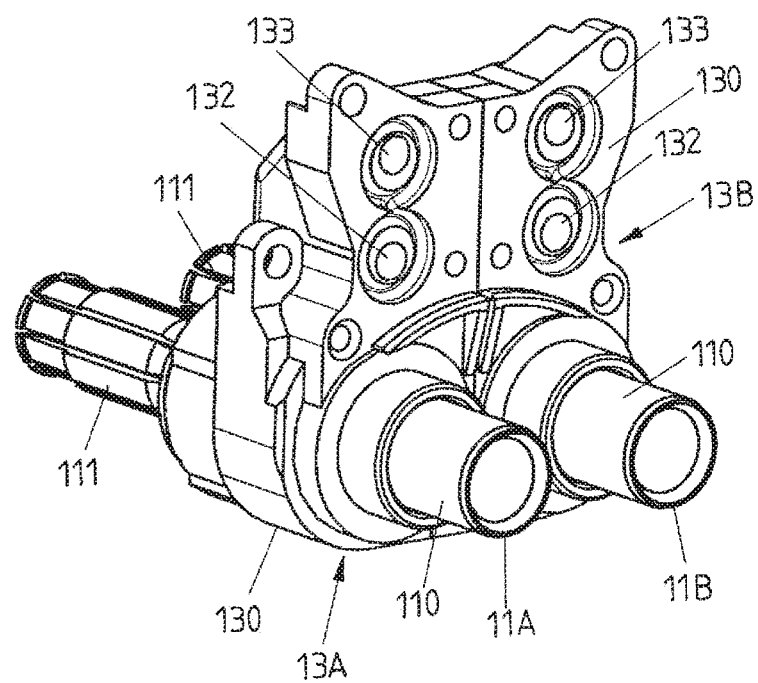
FIG. 9A shows a view of two contact elements, each having a casing element and a cooling housing.
Figure 9B:
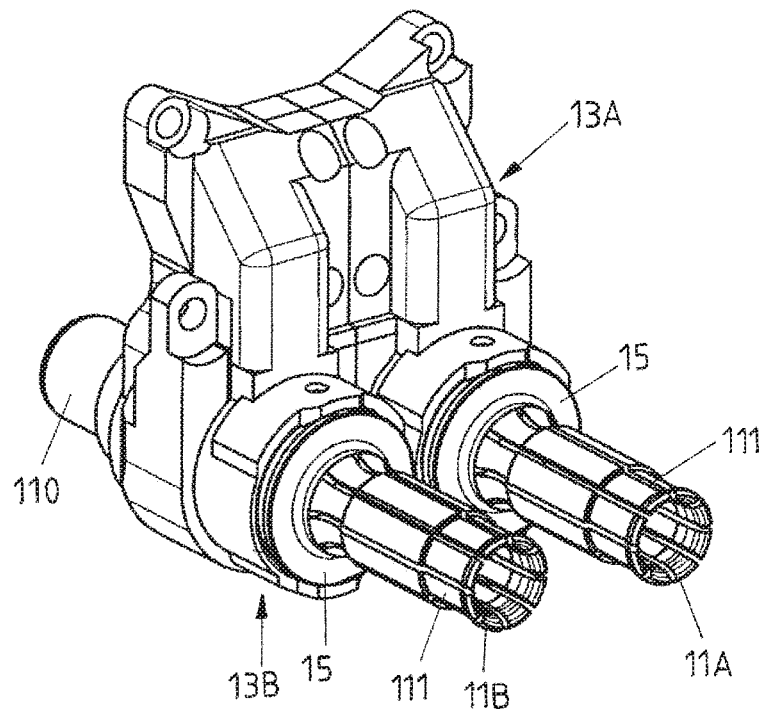
FIG. 9B shows another perspective view of the assembly according to FIG. 9A.

FIGS. 8A and 8B show separate views of a contact element 11A with a cooling housing 13A arranged thereon, while FIGS. 9A and 9B show the two contact elements 11A, 11B realizing the load contacts, together with the cooling housings 13A, 13B arranged thereon.

As can be seen from FIGS. 9A, 9B, the cooling housings 13A, 13B of the contact elements 11A, 11B are designed to be mirror-symmetrical and can be attached to one another in such a way that a uniform block results. Via fastening elements 103 in the form of screws (see FIG. 5), this block of the cooling housings 13A, 13B, together with the distribution element 14 arranged thereon, can be fixed in the housing 10 of the plug connector part 1 so that a simple, loadable mounting of the cooling housings 13A, 13B in the housing 10 results.

As can be seen in FIG. 6 and FIGS. 8A and 9A, an inlet opening 132 and an outlet opening 133 are respectively formed on the cooling housings 13A, 13B. The inlet opening 132 of each cooling housing 13A, 13B is in flow connection with the first end 152 of the cooling channel 159 on the casing element 15, so that a coolant can be introduced in a flow direction F1 via the inlet opening 132 into the cooling channel 159. In contrast, the outlet opening 133 of each cooling housing 13A, 13B is in flow connection with the second end 153 of the cooling channel 159, so that coolant can be discharged from the cooling channel 159 in a flow direction F2 via the outlet opening 133. The flow connection is established in each case via flow channels which extend through the body 130 of the respective cooling housing 13A, 13B.

FIGS. 10 through 16A-16D show views of the distribution element 14, which is fixedly connected to the block of the cooling housings 13A, 13B and serves to distribute coolant from a first coolant line 21 (see FIG. 3) to the inlet openings 132 of the cooling housings 13A, 13B, and to return coolant from the outlet openings 133 via two separate coolant lines 22 (see FIG. 3). The coolant lines 21, 22 are each laid inside the cable 2 and are fed by the charging station 3 or conduct the coolant back to the charging station 3 so that a closed coolant circuit for cooling the contact elements 11A, 11B on the plug connector part 1 is created.

Via fastening points 143, the distribution element 14 can, on the one hand, be connected to the block of the cooling housings 13A, 13B and, on the other, can be fixed in the housing 10 of the plug connector part 1. Fastening elements 103 (see FIG. 5) in the form of screws can, for example, be used for this purpose.

The distribution element 14 has a body 144 to which the first coolant line 21 for supplying the coolant is connected via an inlet port 140 inserted into an opening 140A. In contrast, the two coolant lines 22 for returning the coolant are connected to outlet ports 141 inserted into openings 141A (see FIGS. 10 and 11, for example).

Extending within the body 144 of the distribution element 14 are flow channels 145-148, which serve to conduct the coolant towards the inlet openings 132 and away from the outlet openings 133.

Figure 16A:
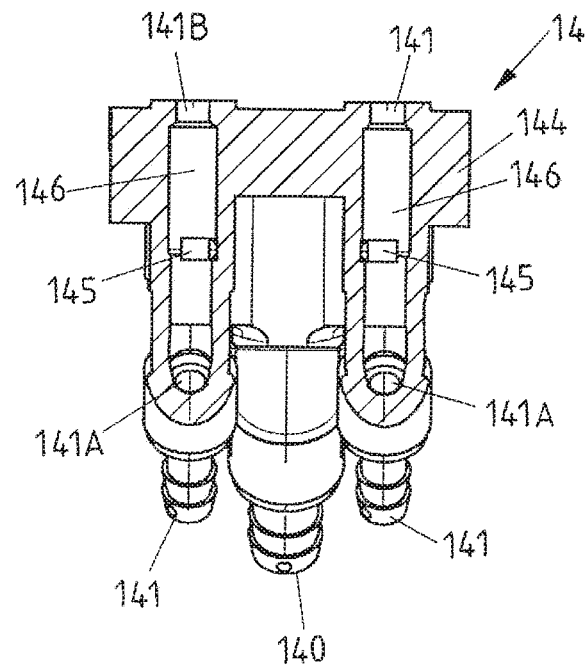
FIG. 16A shows a sectional view along line A-A according to FIG. 15A.
Figure 16B:
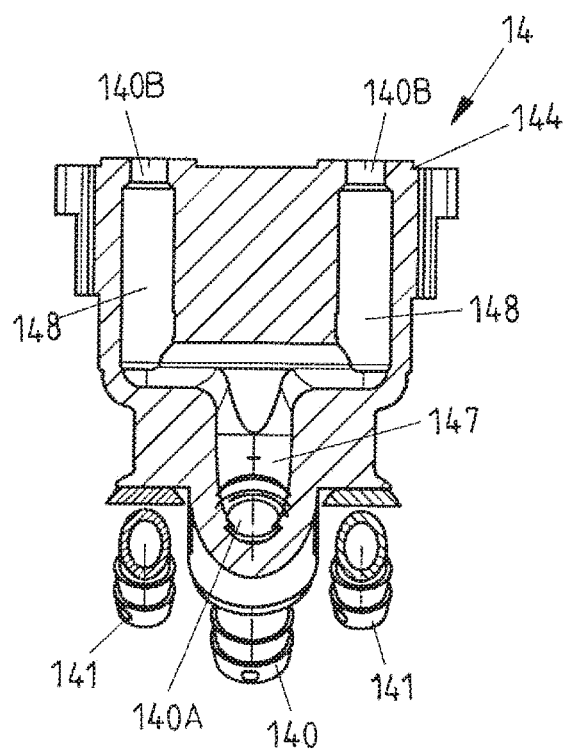
FIG. 16B shows a sectional view along line B-B according to FIG. 15B.

As can be seen from the cross-sectional view of FIG. 16B, the inlet port 140 is in flow connection via a flow channel 147 with two branched flow channels 148, which open into openings 140B. The openings 140B are aligned with the inlet openings of the cooling housings 13A, 13B, wherein the transition between the distribution element 14 and the cooling housings 13A, 13B around the openings 140B is sealed by suitable sealing elements. Via the flow channels 145-148, coolant from the coolant line 21 and the inlet port 140 can thus be conducted into the inlet openings 132 of the cooling housings 13A, 13B and supplied to the cooling channel 159 of each casing element 15.

As can also be seen from the cross-sectional view of FIG. 16A, the outlet ports 141 are in flow connection with openings 141B via flow channels 146. The openings 141B are aligned with the outlet openings 133 of the cooling housings 13A, 13B, wherein a transition between the distribution element 14 and the cooling housings 13A, 13B is, again, sealed by suitable sealing elements. The coolant can thus be conducted from the outlet openings 133 to the outlet ports 141 via the flow channels 146.

Figure 16C:
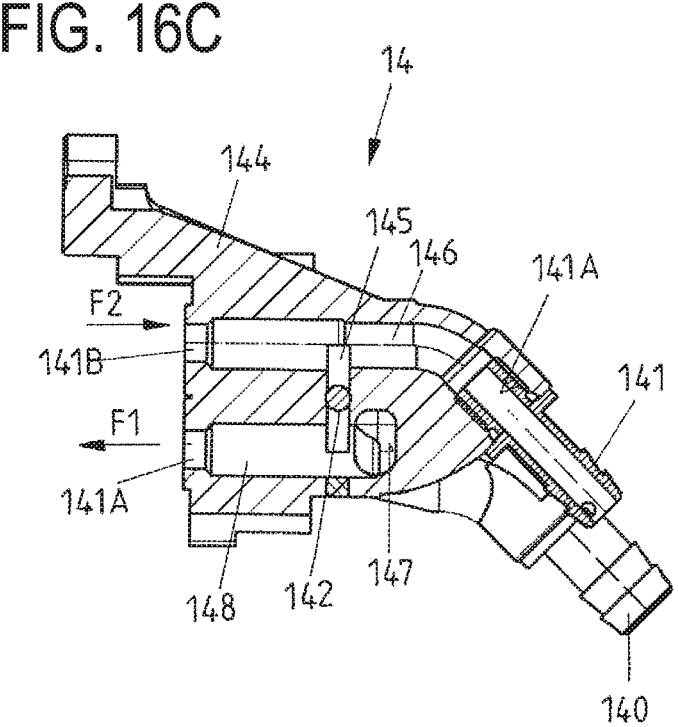
FIG. 16C shows a sectional view along line C-C according to FIG. 15A.
Figure 16D:
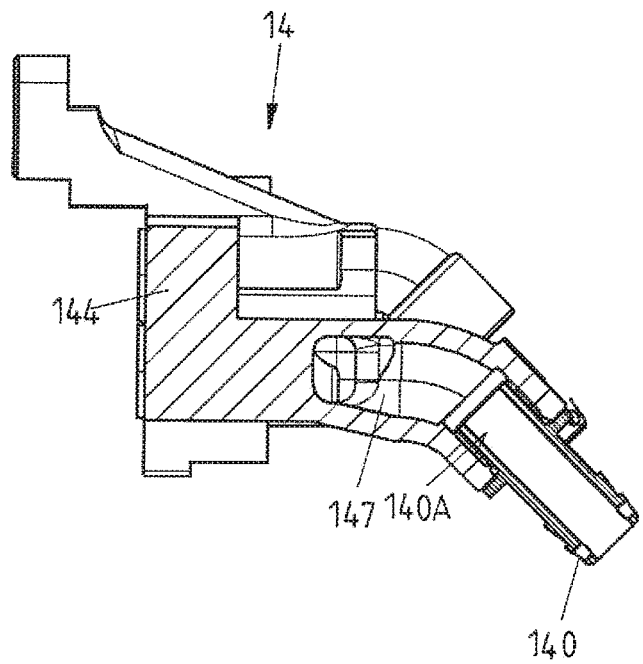
FIG. 16D shows a sectional view along line D-D according to FIG. 15B.

As can be seen in the cross-sectional view according to FIG. 16C, each inlet-side flow channel 148 is in flow connection via a transversely-extending, further flow channel 145 to an overlying outlet-side flow channel 146, so that a short circuit is created between the inlet-side flow channel 148 and the outlet-side flow channel 146. Via this additional flow channel 145, a coolant flow can thus be effected directly from the inlet to the outlet, by bypassing the cooling housings 13A, 13B.

Figure 10:
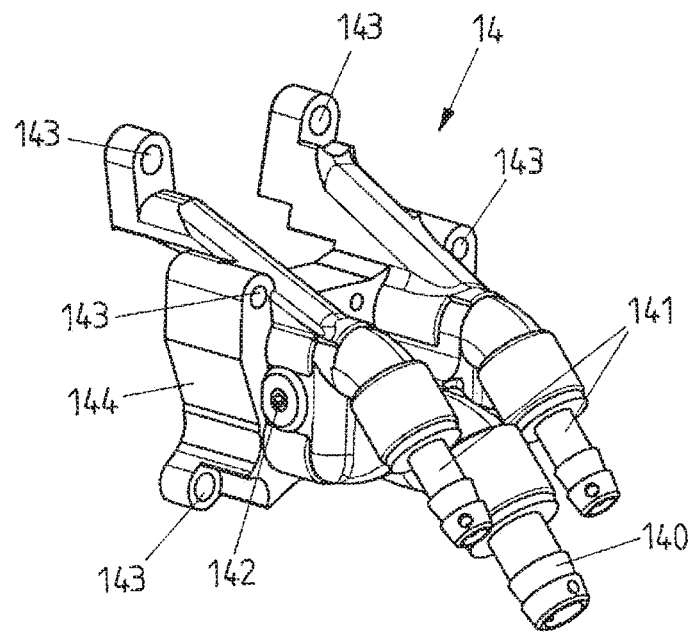
FIG. 10 shows a view of a distribution element for distributing the coolant to the cooling housings.
Figure 11:
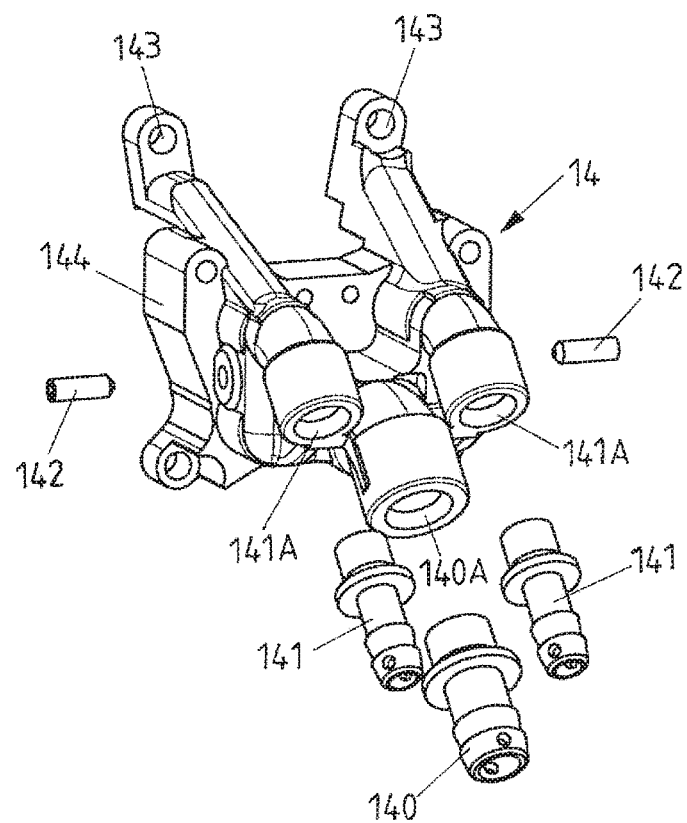
FIG. 11 show an exploded view of the distribution element.
Figure 12:
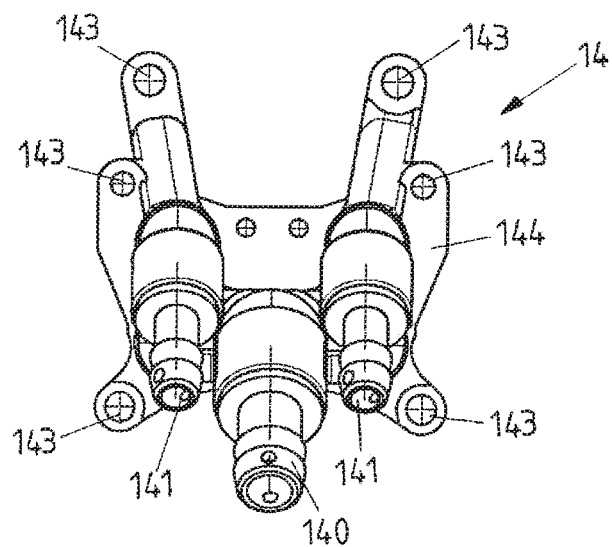
FIG. 12 shows a rear view of the distribution element.
Figure 13:
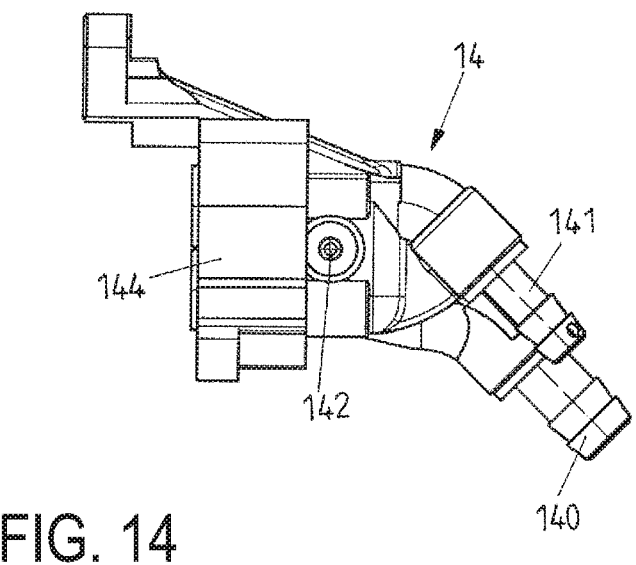
FIG. 13 shows a side view of the distribution element.
Figure 14:
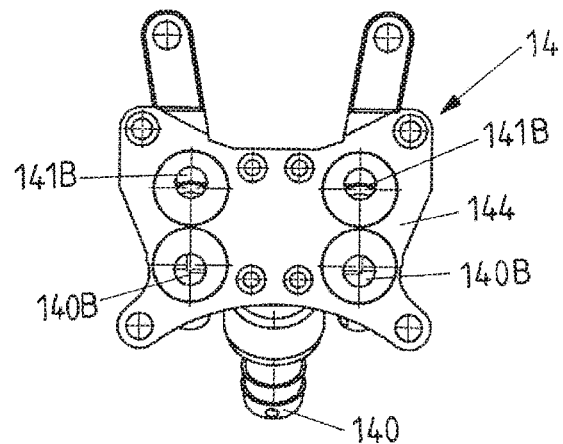
FIG. 14 shows a front view of the distribution element.
Figure 15A:
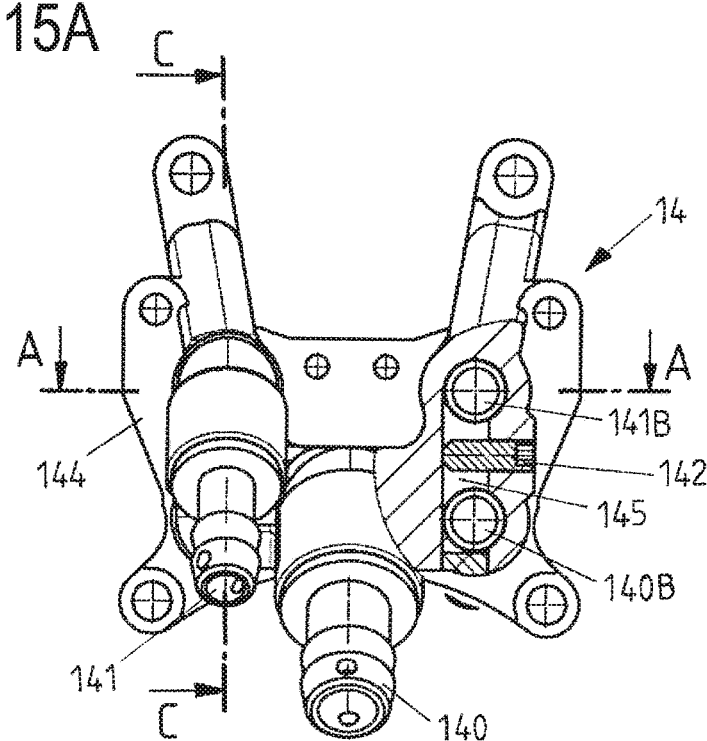
FIG. 15A shows a partial cutaway view of the distribution element.
Figure 15B:
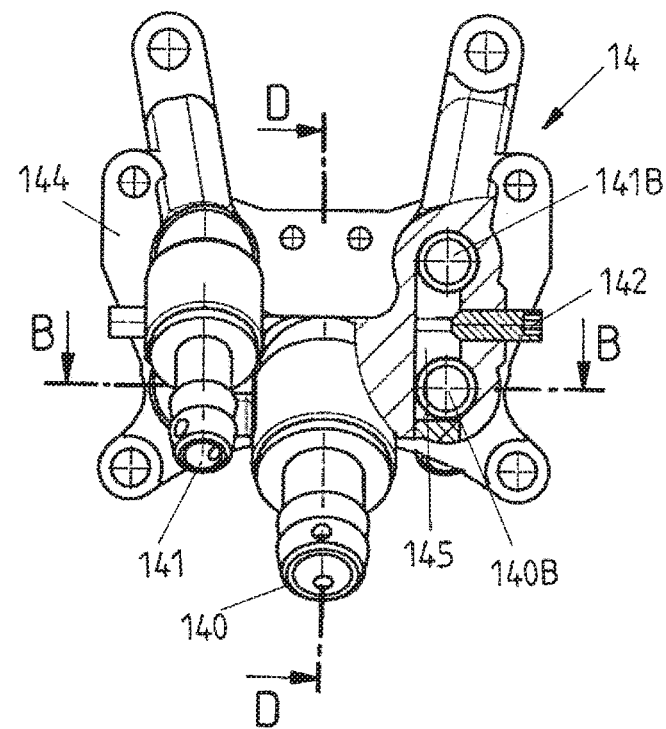
FIG. 15B shows he partial cutaway view according to FIG. 15A, in another position of an adjusting element for adjusting a coolant flow via a third flow channel extending in the distribution element.

Protruding into the flow channels 145 is a respective adjusting element 142 which can be embodied, for example, as a screw element and can be adjusted from outside the body 144 (see, for example, FIGS. 10 and 11). In a first, screwed-in position of the adjusting element 142, shown in FIG. 15A, the flow channel 145 is closed, so that no bypassing flow can flow directly from the inlet to the outlet. In contrast, in another, completely or partially screwed-out position, shown in FIG. 15B, the flow channel 145 is at least partially uncovered, so that bypassing flow directly from the inlet to the outlet is possible.

By means of the adjusting elements 142 associated with the two flow channels 145 on both sides of the body 144, an adjustment of the cooling at the contact elements 11A, 11B is thus possible, so that the cooling power at the contact elements 11A, 11B can be adjusted in a desired manner.

The idea upon which the invention is based is not limited to the previously described exemplary embodiment, but can, in principle, also be realized in a totally different manner.

In the illustrated exemplary embodiment of the plug connector part, load contacts for transmitting a direct current are cooled. In principle, cooling is also conceivable and possible at contact elements which serve to transmit alternating current.

A plug connector part of the type described here can, advantageously, be used as a charging plug or also as a charging socket in a charging system for charging an electrically-operated vehicle. However, an entirely different use of such a plug connector part outside a charging system is also conceivable and possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Plug connector part (charging plug)
10 Housing
100, 101 Plug section
102 Housing part
103 Fastening elements
11A, 11B, 12 Contact elements
110 Shaft
111 Contact socket
112 Circumferential surface
120 Contact holder
13A, 13B Cooling housings
130 Body
131 Opening
132, 133 Opening
14 Distribution element
140 Inlet port
140A, 140B Opening
141 Outlet port
141A, 141B Opening
142 Adjusting element
143 Fastening points
144 Body
145-148 Flow channel
15 Casing element
150 Body
151 Rib
152, 153 End
154 Seat
155, 156 Sealing element
157 Heat-conducting paste
158 Plug opening
159 Cooling channel
2 Charging cable
20 Electrical line
200, 201 End
21, 22 Coolant line
3 Charging station
4 Vehicle
40 Charging socket
41 Counter-contact element
E Plug-in direction
F1, F2 Flow direction

The invention claimed is:

1. A plug connector part, comprising:
a plug section configured for plugging connection to an associated counter plug connector part;
at least one contact element arranged on the plug section and having at least one electrically-conductive contact section configured for plugging connection to an associated counter-contact element of the counter plug connector part, and a shaft section connected to the contact section configured to secure an electrical line to the contact element; and a casing element that is attachable to the shaft section of the at least one contact element and has a body, a plug opening formed in the body configured to receive the shaft section, and a cooling channel which is formed in or on the body and extends around the plug opening for conducting a coolant.

2. The plug connector part according to claim 1, wherein the cooling channel extends helically around the plug opening.

3. The plug connector part according to claim 1, wherein the shaft section is cylindrical.

4. The plug connector part according to claim 1, wherein the contact element is pluggable onto the associated counter-contact element along a plug-in direction,
wherein the shaft section has a circumferential surface extending circumferentially around the plug-in direction, and
wherein the body of the casing element extends around the circumferential surface when the shaft section is accommodated in the plug opening.

5. The plug connector part according to claim 4, further comprising a heat-conducting paste arranged between the circumferential surface and the body of the casing element when the shaft section is accommodated in the plug opening.

6. The plug connector part according to claim 1, wherein the body of the casing element comprises an electrically-insulating material and
wherein, when the shaft section is accommodated in the plug opening, the coolant flowing through the cooling channel is electrically insulated from the shaft section via the body.

7. The plug connector part according to claim 1, wherein the casing element is inserted into a cooling housing.

8. The plug connector part according to claim 7, wherein the casing element together with the cooling housing delimits the cooling channel.

9. The plug connector part according to claim 7, wherein the plug connector part has a pair of two contact elements, and
wherein a casing element and a cooling housing are arranged on the shaft section of each contact element.

10. The plug connector part according to claim 9, wherein the cooling housings of the two contact elements are mirror-symmetrical to one another and are connected to one another.

11. The plug connector part according to claim 1, further comprising a distribution element which has at least one inlet port configured to introduce the coolant and at least one outlet port configured to discharge the coolant.

12. The plug connector part according to claim 11, wherein the distribution element is fixedly connected to cooling housings of a pair of contact elements.

13. The plug connector part according to claim 12, wherein the at least one inlet port is in flow connection via first flow channels with an inlet opening of each cooling housing in order to introduce the coolant into the cooling channel of the casing element arranged on the cooling housing, and the at least one outlet port is in flow connection via second flow channels with an outlet opening of each cooling housing in order to discharge the coolant from the cooling channel of the casing element arranged on the cooling housing.

14. The plug connector part according to claim 13, wherein the distribution element has at least one third flow channel extending between at least one of the first flow channels and at least one of the second flow channels for a flow of coolant between the first flow channels and the second flow channels.

15. The plug connector part according to claim 14, wherein the flow of coolant between the first flow channels and the second flow channels is adjustable via the at least one third flow channel by an adjusting element.

* * * * *